UNITED STATES PATENT OFFICE.

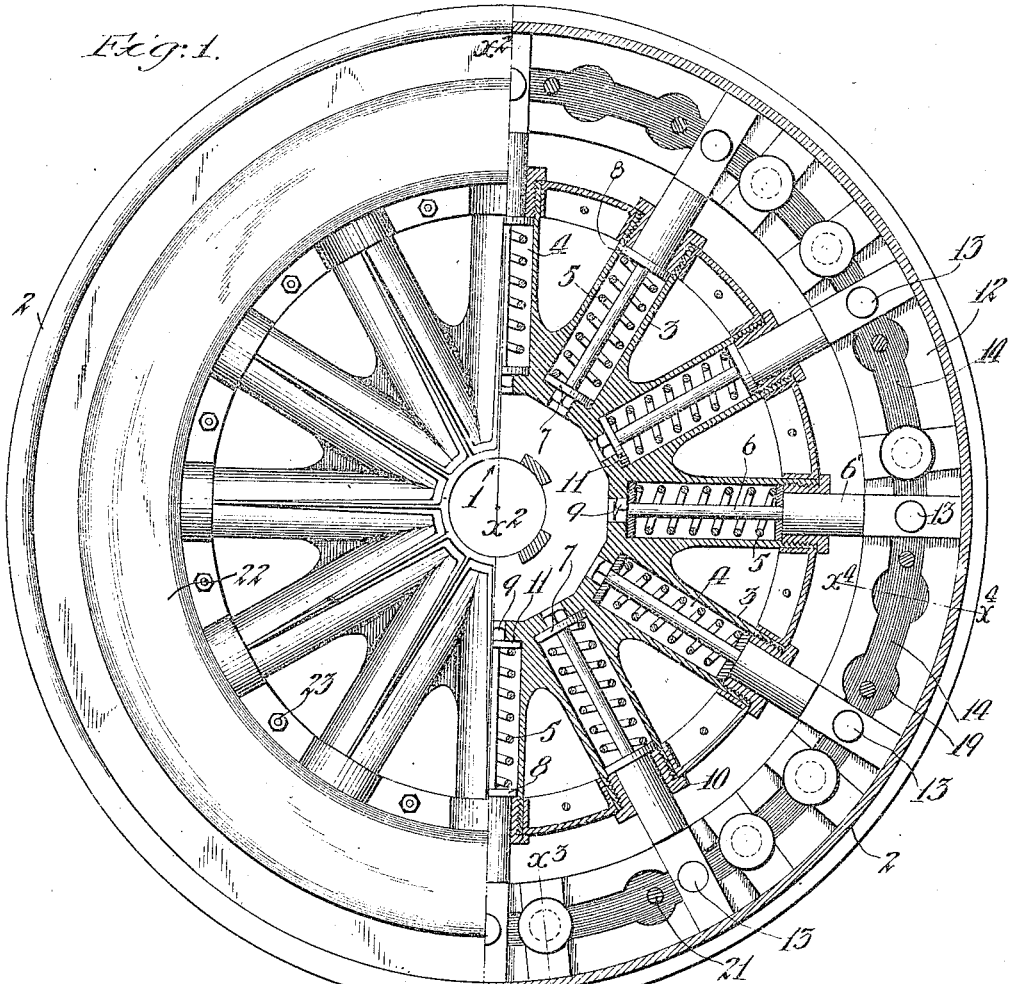

GEORGE H. LANGTON AND JAMES M. KELLERMAN, OF LOS ANGELES, CALIFORNIA, ASSIGNORS TO AUTO AIR CUSHION WHEEL COMPANY, OF LOS ANGELES, CALIFORNIA, A CORPORATION OF CALIFORNIA.

SPRING-WHEEL.

1,017,895.   Specification of Letters Patent.   Patented Feb. 20, 1912.

Application filed July 26, 1909. Serial No. 509,715.

*To all whom it may concern:*

Be it known that we, GEORGE H. LANGTON and JAMES M. KELLERMAN, citizens of the United States, residing at Los Angeles, in the county of Los Angeles and State of California, have invented a new and useful Spring-Wheel, of which the following is a specification.

The main object of the present invention is to provide a spring wheel of strong construction and durable and efficient in operation.

The invention relates to the type of spring wheels in which a hub member is spring supported on an outer or rim member by elastic spoke means and the invention is directed particularly to the connection and support of said member in such manner that said members are supported effectively against lateral or side strains without undue friction or wear on the parts.

Another object of the invention is to provide for incasing or inclosing the working parts so as to increase the durability of the structure.

Other objects of the invention will appear hereinafter.

The accompanying drawings illustrate the invention, and referring thereto:

Figure 1 is a partly sectional side elevation of the wheel. Fig. 2 is a transverse section on the line $x^2$—$x^2$ in Fig. 1. Fig. 3 is a transverse section of the rim member on the line $x^3$—$x^3$ in Fig. 1. Fig. 4 is a transverse section on the line $x^4$—$x^4$ in Fig. 1.

The wheel comprises a hub or central member 1 and a felly or rim member 2 on which the hub member is spring supported. The felly is adapted to receive any suitable wearing means or shoe, such as a solid rubber tire, said member 2 being flanged to retain said tire. Hub member 1 is provided with a plurality of radial spokes, projecting therefrom integral therewith each spoke being hollow or tubular to serve as a chamber or casing 4 for a spring member 5 which serves as the resilient element of the wheel. A spoke bar 6 extends axially in each tubular spoke 3 within the spring 5 and two washers 7, 8 which slide freely within said tubular spoke. A head 9 on the inner end of the spoke bar 6 engages with the inner washer 7 which normally rests in contact with an annular shoulder 11 at the inner end of said casing 4 and the outer washer 8 engages with a bushing 10 which screws into the outer end of the tubular spoke 3. Each spoke bar 6 is connected at its outer end to the rim member 2 in such manner as to permit relative tangential movement of said parts while preventing relative radial movement, so that the spoke bar 6 is forced to move toward or from the hub in correspondence with the motion of the rim. Two annular rim plates 12 extend directly within the rim 2 and in contact therewith and on each side of the series of enlarged heads 6' on said spoke bars having flattened portions forming shoulders and extending between said rim plates and being provided with transverse pins or projections 13 which engage in circular grooves 14 in the respective rim plates 12, so as to prevent relative radial movement of said parts while permitting tangential movement. The rim plates 12 are preferably fastened by means providing for interlocking of said plates with the rim 2 without the use of external or exposed bolts or screws. For this purpose the rim plates 12 are further provided with annular grooves 15 forming enlargements or extensions of the grooves 14 to receive and engage flanges 16 of buttons 17 which are formed on radial studs 18 extending inwardly from the rim member 2. To enable insertion of said button flanges within said grooves the walls of the said grooves are cut away at intervals as shown at 19 in the manner of a key-hole slot, the resulting enlargement being sufficient to permit passage therethrough of the heads or flanges 16 of the buttons 17, so that by passing the rim plates or rings 12 within the rim member 2 with these enlarged openings 19 in register with the respective buttons 17, the said rim plates or rings may be slipped onto said buttons and then by turning said rim plates or rings through a sufficient angle as shown in Fig. 1, the buttons or flanges thereon may be interlocked with the circular grooves 15 to hold the parts tightly in proper relative position. With this construction there are no bolts or screw heads and the liability of such devices to rust and wear and to work loose is avoided. The parts are held by cross pins 21 pinning the parts 12 together, so as to prevent circumferential slip.

Spring members 5 are brought to a condition of compression by screwing in the plugs or bushings 10 and the dimensions and character of the springs is such that the normal compression thus brought onto the springs is in excess of the load which is liable to be delivered to the springs in normal operation due to the weight of the vehicle and its contents.

Each spoke bar 6 is provided with an enlarged head or collar 6' whose inner end normally engages with the outer washer 8 aforesaid and whose outer end or face normally engages with the inside edges of the rim plates or rings 12.

A dust guard means is preferably provided for closing the space between the tubular spokes 4 and the rim plates or rings 12, said dust guard means consisting of annular plates 22 clamped by bolts 23 to the spokes of the hub or central portion 1.

The operation is as follows: In normal position the outer washer 8 for each spring bears against the bushing 10 and the inner washer 7 for each spring bears against the shoulder 11 at the inner end of the tubular casing for the spring, the said washers being held in this position by the pressure of the spring. The weight of the vehicle and its contents tends to press the hub member downwardly and this pressure in the case of the springs below the center of the wheel presses the shoulder 11 against the inner washer 7 and tends to relieve the condition of pressure of the inner washer 7 against the nut 9, but is not sufficient to overcome the pressure of the spring or to cause said washer to move away from said nut. At the same time the downward pressure due to the weight of the vehicle tends in the case of the springs above the center of the wheel to press the bushing 10 downwardly on the washer 8 and thereby to relieve the condition of pressure of said washer on the head 6' of the spoke bar, but said pressure is not sufficient to cause said washer to move out of contact with said head. Thus, as long as there is only the normal pressure exerted upon the wheel there is no substantial yielding of the resilient members thereof and there is, therefore, no distortion or flexure of the springs when the vehicle is traveling without jar or shock, for example, on a smooth road. But when an obstacle is encountered and a vertical jar is, therefore, imparted to the wheel the strains which are produced at the points of contact above referred to are sufficient to cause the washer 7 for the lower spring to be moved away from the bolt head 9 of said spring and the washer 8 for the upper spring or springs to move away from the corresponding spoke bar head 6", so that at such times the weight of the vehicle becomes resiliently supported and the shock or jar is taken up. Owing to the fact that there is no yielding of the resilient support under normal or smooth running conditions the life of the springs is indefinitely prolonged and the wear of the entire mechanism is reduced to a minimum. Furthermore, all strain or shock to be absorbed is delivered to the spring to compress the same and under no condition do any of the springs expand in absorbing a shock. This action prolongs the life of the springs.

In the operation of the wheel, the pins 13 engage with the rim members by a free sliding connection, their movement not being opposed by any springs or other devices, so that the movement of the hub relatively to the rim is restrained wholly by the springs in the spoke members.

In the relative vertical movement of the hub member and the rim member, the spoke bars or piston members 6 which are on each side of the center will have a movement in a circumferential direction with relation to the rim member. In this movement the transverse projections 13 on the spoke bars or piston members 6 slide circumferentially in the grooves in the rim member, to a limited extent. As the spoke bars are guided radially within the tubular spokes, all of which are rigidly connected and said spoke bars are also guided in the rim member, the parts are effectively held by sliding engagement so as to stand lateral or side pressures in a manner which is not possible with pivoted or swinging spoke bars. Such sliding engagement, however, involves considerable friction in case the engagement is sufficient to effectively prevent lateral motion and it is, therefore, of importance with such a connection to provide spring means as above described which will prevent radial motion in the normal operation of the wheel, such radial motion taking place only when the wheel is subjected to violent radial thrust. This is also of importance in reducing to a minimum the wear on the inclosing means 22 which necessarily makes a sliding contact with the rim, so that elimination of the radial motion in the order of the operation enables such sliding contact of the inclosing means to be made substantially dust-tight without leading to objectionable friction in the normal operation.

What we claim is:

1. In a spring wheel, the combination with the hub member, spoke bars mounted to move radially therein, spring means engaging said spoke bars and hub member to be compressed in such radial movement of the spoke bars in either direction; a tire member, an outer rim, annular plates within said outer rim and having circumferential grooves, and buttons carried by the outer rim and engaging said grooves, the grooved portions of said plates being provided with flanges interlocking with the buttons, said interlocking flanges being cut away at intervals for insertion of the buttons, each of the aforesaid spoke bars being provided with a transverse projection engaging in said grooves to prevent relative radial movement of the bar and rim member but permit limited circumferential movement.

2. In a spring wheel, the combination with a hub member, and a rim member; of spoke bars mounted to move radially in the hub member, spring means engaging said spoke bars, and hub member, so as to be compressed in such radial movement of the spoke bars in either direction, heads on the outer ends of the spoke bars, having flattened outer ends providing shoulders and bearing against the rim member, and annular rim plates fitting between the rim member and the shoulders of the heads and against the flattened outer ends of the latter, said rim plates being provided with annular grooves on their opposed faces, means for securing the flattened outer ends of the heads and the annular rim plates together, studs connected to the rim extending between said rim plates, and buttons extending from said studs and engaging said grooves in said rim plates to secure the rim on said rim plates.

3. In a spring wheel the combination with a hub member, and a rim member; of spoke bars mounted to move radially in the hub member, spring means engaging said spoke bars and hub member so as to be compressed in such radial movement of the spoke bars in either direction, heads on the outer ends of the spoke bars having flattened outer ends providing shoulders and bearing against the rim member, and annular rim plates fitting between the rim member and the shoulders of the heads and against the flattened outer ends of the latter, means for securing the flattened outer ends of the heads and the annular rim plates together, means for securing the rim on said annular rim plates and guard means for closing the spaces between the hub member and the rim member.

4. In a spring wheel, the combination with a hub member, and a rim member; of spoke bars mounted to move radially in the hub member, spring means engaging said spoke bars and hub member so as to be compressed in such radial movement of the spoke bars in either direction, heads on the outer ends of the spoke bars having flattened outer ends providing shoulders and bearing against the rim member, and annular rim plates having circular grooves and fitting between the rim member and the shoulders of the heads and against the flattened outer ends of the latter, transverse pins extending across the flattened outer ends of the heads and entering the circular grooves of the annular rim plates, and means for securing the rim on said rim plates.

5. In a spring wheel, the combination with a hub member and a rim member, of spoke bars mounted to move radially in the hub member, spring means engaging said spoke bars and hub member so as to be compressed in such radial movement of the spoke bars in either direction, heads on the outer ends of the spoke bars having flattened outer ends providing shoulders and bearing against the rim member and annular rim plates having circular grooves cut away at intervals and annular grooves providing annular flanges and fitting between the rim member and the shoulders of the heads and against the flattened outer ends of the latter, transverse pins extending across the flattened outer ends of the heads and entering the circular grooves of the rim plates, and radial studs extending inwardly from the rim member having buttons, occupying the circular grooves, and formed with flanges passed through the cut away parts of the circular grooves and occupying the annular grooves and engaging the annular flanges.

In testimony whereof, we have hereunto set our hands at Los Angeles, California, this 9th day of July 1909.

GEORGE H. LANGTON.
JAMES M. KELLERMAN.

In presence of—
F. M. TOWNSEND,
FRANK L. A. GRAHAM.